United States Patent
Suzuki et al.

(10) Patent No.: US 9,444,268 B2
(45) Date of Patent: Sep. 13, 2016

(54) DISCHARGE CONTROLLER

(75) Inventors: Shin Suzuki, Kanagawa (JP); Yoichiro Tashiro, Tokyo (JP)

(73) Assignees: NEC ENERGY DEVICES, LTD., Kanagawa (JP); NEC CORPORATION, Tokyo (JP)

( * ) Notice: Subject to any disclaimer, the term of this patent is extended or adjusted under 35 U.S.C. 154(b) by 439 days.

(21) Appl. No.: 13/991,674

(22) PCT Filed: Nov. 28, 2011

(86) PCT No.: PCT/JP2011/077352
§ 371 (c)(1),
(2), (4) Date: Jun. 5, 2013

(87) PCT Pub. No.: WO2012/086368
PCT Pub. Date: Jun. 28, 2012

(65) Prior Publication Data
US 2013/0249491 A1  Sep. 26, 2013

(30) Foreign Application Priority Data
Dec. 24, 2010  (JP) ................. 2010-287948

(51) Int. Cl.
*H02J 7/00* (2006.01)
*H01M 10/44* (2006.01)
*B60L 11/18* (2006.01)
*H01M 10/052* (2010.01)

(52) U.S. Cl.
CPC ............ *H02J 7/00* (2013.01); *B60L 11/1859* (2013.01); *B60L 11/1862* (2013.01); *B60L 11/1866* (2013.01); *H01M 10/441* (2013.01); *H01M 10/448* (2013.01); *H02J 7/0014* (2013.01); *H02J 7/0063* (2013.01); *B60L 2240/80* (2013.01); *H01M 10/052* (2013.01); *H01M 2220/20* (2013.01); *H02J 2007/0067* (2013.01); *Y02T 10/7005* (2013.01); *Y02T 10/705* (2013.01); *Y02T 10/7011* (2013.01); *Y02T 10/7044* (2013.01); *Y02T 10/7055* (2013.01)

(58) Field of Classification Search
CPC .............................. H02J 7/0024; H02J 7/1423
USPC ....................................................... 320/126
See application file for complete search history.

(56) References Cited

U.S. PATENT DOCUMENTS 6,133,711 A  10/2000 Hayashi

FOREIGN PATENT DOCUMENTS

| JP | 11-069636 A | | 3/1999 | |
|----|-------------|---|--------|---|
| JP | 2008226511 | * | 9/2008 | ............ H01M 10/44 |

(Continued)

OTHER PUBLICATIONS

International Search Report of PCT/JP2011/077352 dated Feb. 14, 2012.

*Primary Examiner* — Edward Tso
*Assistant Examiner* — Ahmed Omar
(74) *Attorney, Agent, or Firm* — Sughrue Mion, PLLC

(57) ABSTRACT

Remaining capacity calculation section (110) calculates remaining capacities for each of cells (300-1) and (300-2) connected in parallel with each other, and control section (130) discharges one of cells (300-1) and (300-2) having priority until the remaining capacity of that cell becomes equal to a second threshold value stored in storage section (120), if the remaining capacity of the one of the cells calculated by remaining capacity calculation section (110) is equal to a first threshold value stored in storage section (120).

12 Claims, 15 Drawing Sheets

(56) References Cited

FOREIGN PATENT DOCUMENTS

| JP | 2009-033936 A | 2/2009 | | |
| JP | 2009-240078 | * 10/2009 | | H02J 7/00 |
| JP | 2009-240078 A | 10/2009 | | |
| JP | 2010097760 | * 4/2010 | | H01M 10/44 |
| JP | 2010-273519 A | 12/2010 | | |

* cited by examiner

Fig.3

| cell | full-charge capacity |
|---|---|
| 300-1 | 10Ah |
| 300-2 | 9.6Ah |

112 full-charge capacity hold section

Fig.4

| threshold value | capacity |
|---|---|
| upper limit | 6Ah |
| lower limit | 4Ah |

120 storage section

Fig.9

220 storage section

| threshold value | capacity |
|---|---|
| upper limit | 2.4V |
| lower limit | 1.6V |

DISCHARGE CONTROLLER

CROSS REFERENCE TO RELATED APPLICATIONS

This is a National Stage of International Application No. PCT/JP2011/077352 filed Nov. 28, 2011, claiming priority based on Japanese Patent Application No. 2010-287948 filed Dec. 24, 2010, the contents of all of which are incorporated herein by reference in their entirety.

TECHNICAL FIELD

The present invention relates to a discharge controller, a discharge control method and a program for controlling discharge of cells.

BACKGROUND ART

In recent years, in various fields, there have been growing concerns about environmental problems.

With these concerns, in the field of electric power supply therein, certain approaches to power supply such as photovoltaic (PV) power generation and use of secondary cells used in electric vehicles (EVs) and hybrid EVs (HEVs) have attracted attention. Lithium-ion secondary cells are considered promising in such secondary cells. It is expected that lead storage cells will be replaced with Lithium-ion secondary cells in response to widespread use thereof in the future.

As a rule, connecting an old cell (having a small discharge capacity) and a new cell (having a large discharge capacity) in parallel with each other should be avoided. This is for the purpose of avoiding a cross current caused by a difference between the voltages of the cells. A large cross current can cause excess current or abnormal heat generation. The same can also be said with respect to the above-described secondary cells.

A system has therefore been devised in which respective switches for making connection/disconnection are provided for a plurality of cells connected in parallel with each other, and a switch that is provided only for the cell that has a higher voltage than that of the other cells is connected (maintained in the on state) at the time of discharge until the differences between the voltages of the cells become equal to or smaller than a predetermined value (see, for example, Patent Literature 1).

CITATION LIST

Patent Literature

Patent Literature 1: JP2009-033936A

SUMMARY OF INVENTION

Technical Problem

In recent years, a "degradation region" in which degradation of a cell is promoted in an intermediate region of a lithium-ion cell such as described above (the region from the upper limit to the lower limit of the discharge capacity in which the cell can supply power) has been discovered. Such a degradation region is noticeably recognized in lithium-ion cells having manganese-based positive electrodes in particular. Degradation of a cell is promoted by passage through the degradation region if a substantial length of time is taken to pass through the degradation region while the discharge capacity remaining in the cell is being reduced by discharge of the cell. It is, therefore, best to prohibit passage through this region to ensure long life for the cell. In a case where passage through the degradation region is required, however, there is a need to complete passage through the degradation region as fast as possible. There is the risk that degradation of a plurality of cells connected in parallel with each other will be particularly pronounced due to the low rate of reduction in discharge capacity for each cell.

Even when the technique described in Patent Literature 1 is used, an extension of the life of the cell cannot be achieved since discharge considering this degradation region cannot be performed.

An object of the present invention is to provide a discharge controller, a discharge control method and a program as a solution to the above-described problem.

Solution to Problem

A discharge controller of the present invention is a discharge controller for controlling discharge of a plurality of cells connected in parallel with each other, the controller including:

a remaining capacity calculation section that calculates remaining capacities for each of the plurality of cells; and a control section that, when the remaining capacity of one of the plurality of cells calculated by the remaining capacity calculation section becomes equal to a first threshold value, discharges that cell having priority until the remaining capacity of that cell becomes equal to a second threshold value.

A discharge control method of the present invention is a discharge control method of controlling discharge of a plurality of cells connected in parallel with each other, the method including the steps of:

calculating remaining capacities for each of the plurality of cells; and discharging, when the calculated remaining capacity of the one of the plurality of cells becomes equal to a first threshold value, that cell having priority until the remaining capacity of that cell becomes equal to a second threshold value.

A program of the present invention is a program for making a controller that controls discharge of a plurality of cells connected in parallel with each other execute a process that consists of the steps of:

calculating remaining capacities for each of the plurality of cells; and discharging, when the calculated remaining capacity of the one of the plurality of cells becomes equal to a first threshold value, that cell having priority until the remaining capacity of that cell becomes equal to a second threshold value.

Advantageous Effect of Invention

As described above, according to the present invention, extension of the life of cells can be achieved.

BRIEF DESCRIPTION OF DRAWINGS

FIG. 3 is a diagram showing an example of a full-charge capacity stored in a full-charge capacity hold section shown in FIG. 2.

FIG. 4 is a diagram showing an example of threshold values stored in a storage section shown in FIG. 1.

FIG. 9 is a diagram showing an example of threshold values stored in a storage section shown in FIG. 6.

DESCRIPTION OF EMBODIMENTS

Exemplary embodiments will be described below with reference to the drawings.

Figure 1:
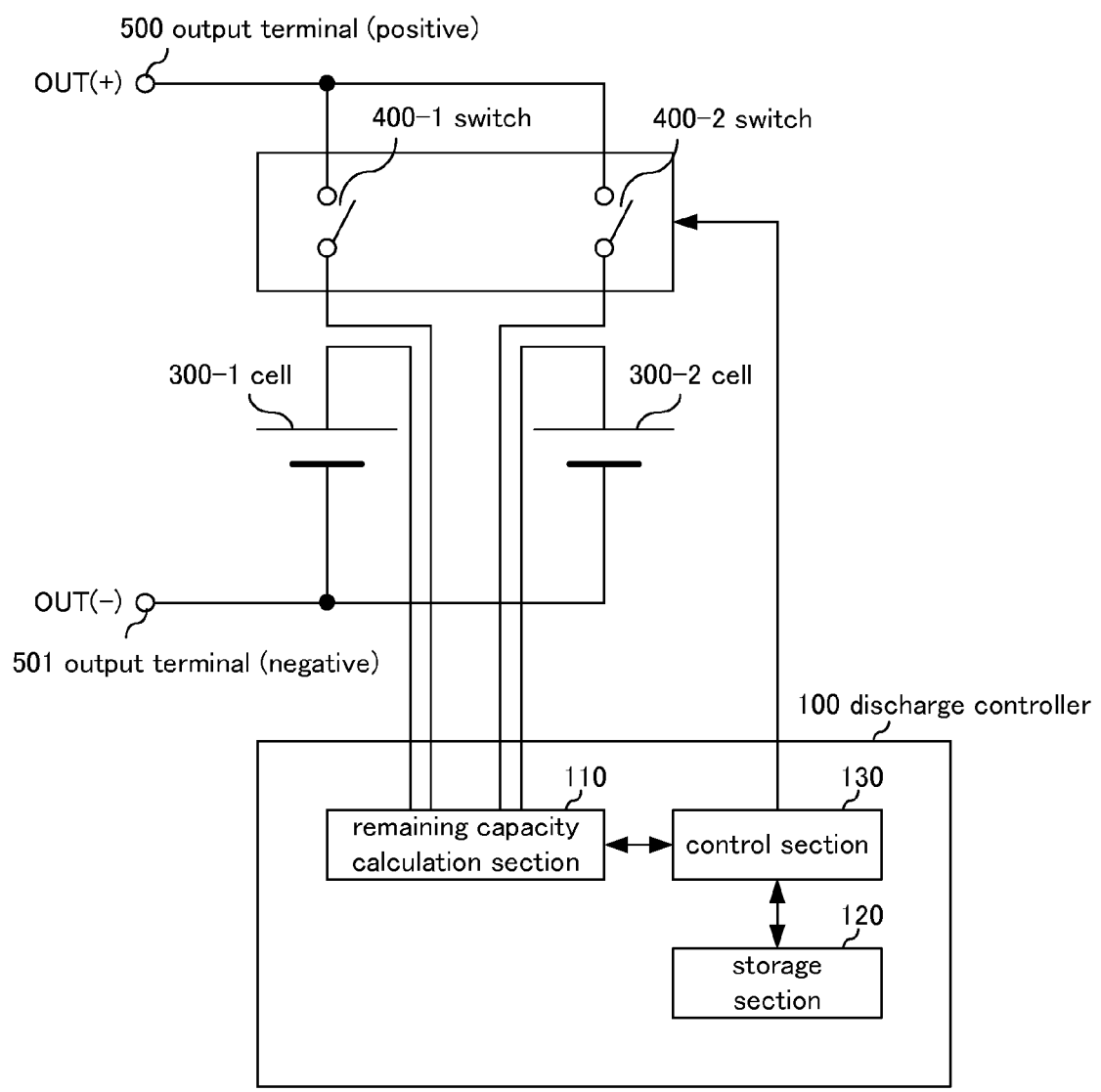
FIG. 1 is a diagram showing an exemplary embodiment of a discharge controller of the present invention.

FIG. 1 is a diagram showing an exemplary embodiment of a discharge controller of the present invention.

As shown in FIG. 1, the present exemplary embodiment includes discharge controller 100, cells 300-1 and 300-2, switches 400-1 and 400-2, output terminal (positive) 500 and output terminal (negative) 501.

Cells 300-1 and 300-2 are lithium-ion cells connected in parallel with each other. Negative electrode sides of cells 300-1 and 300-2 are connected to output terminal (negative) 501. Positive electrode sides of cells 300-1 and 300-2 are connected to switches 400-1 and 400-2, respectively, via discharge controller 100. The number of cells connected in parallel with each other is not limited to two.

Switches 400-1 and 400-2 are switches to be closed/opened to establish or break connections between cells 300-1 and 300-2 and output terminal (positive) 500 through which cells 300-1 and 300-2 are externally discharged. This closing/opening is controlled by discharge controller 100. The number of switches is the same as the number of cells.

Discharge controller 100 controls discharge of cells 300-1 and 300-2 by controlling closing/opening of switches 400-1 and 400-2 based on remaining capacities of cells 300-1 and 300-2.

In discharge controller 100, remaining capacity calculation section 110, storage section 120 and control section 130 are provided, as shown in FIG. 1.

Remaining capacity calculation section 110 calculates remaining capacities of cells 300-1 and 300-2. Remaining capacity calculation section 110 calculates, as remaining capacities, values which are the results of subtraction of values obtained by measuring currents flowing from cells 300-1 and 300-2 and the time from a start of discharge of cells 300-1 and 300-2 and by multiplying the measured currents and time from the full-charge capacities of cells 300-1 and 300-2.

Figure 2:
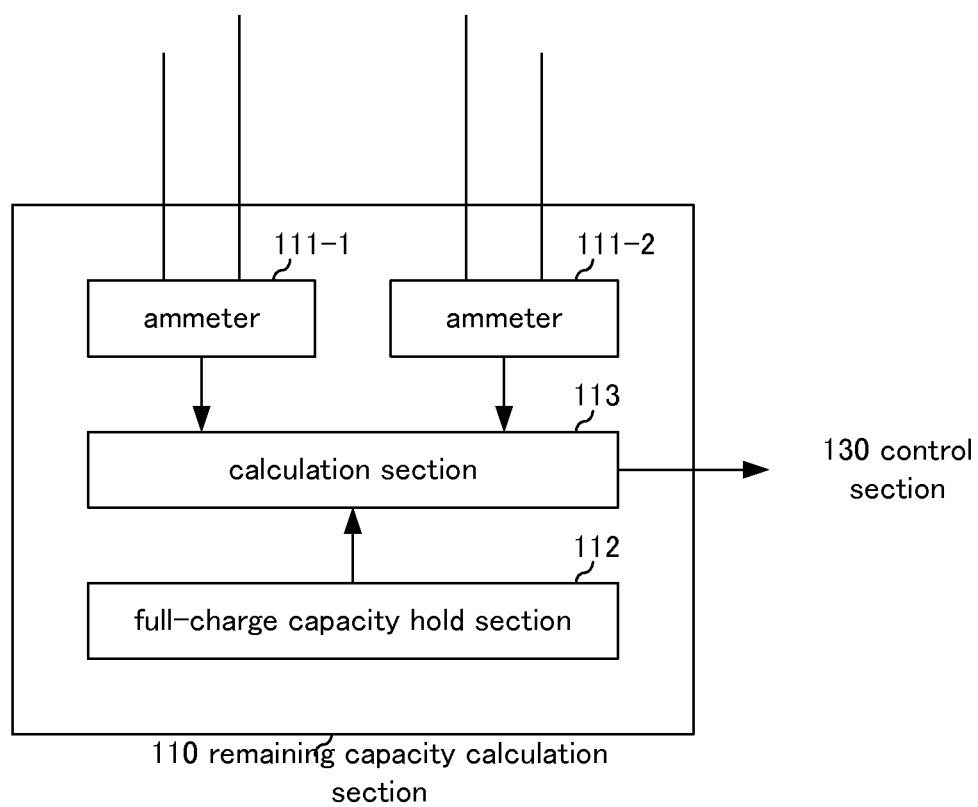
FIG. 2 is a diagram showing an example of an internal configuration of a remaining capacity calculation section shown in FIG. 1.

FIG. 2 is a diagram showing an example of an internal configuration of remaining capacity calculation section 110 shown in FIG. 1.

In remaining capacity calculation section 110 shown in FIG. 1, ammeters 111-1 and 111-2, full-charge capacity hold section 112 and calculation section 113 are provided, as shown in FIG. 2.

Ammeter 111-1 measures a current flowing from cell 300-1. Ammeter 111-1 outputs the measured current value of cell 300-1 to calculation section 113.

Ammeter 111-2 measures a current flowing from cell 300-2. Ammeter 111-2 outputs the measured current value of cell 300-2 to calculation section 113.

Full-charge capacity hold section 112 stores in advance the capacities of cells 300-1 and 300-2 when the capacities are fully charged.

FIG. 3 is a diagram showing an example of the full-charge capacity stored in full-charge capacity hold section 112 shown in FIG. 2.

In the full-charge capacity hold section 112 shown in FIG. 2, the capacities of cells 300-1 and 300-2 when the cells are fully charged are stored as full-charge capacities, as shown in FIG. 3. This information is written in advance.

For example, as shown in FIG. 3, cell 300-1 and a full-charge capacity 10 Ah are stored while being associated with each other. This indicates that the capacity of cell 300-1, when the cell is fully charged, is 10 Ah.

Also, as shown in FIG. 3, cell 300-2 and a full-charge capacity 9.6 Ah are stored while being associated with each other. This indicates that the capacity of cell 300-2 when the cell is fully charged is 9.6 Ah.

Calculation section 113 calculates remaining capacities of cells 300-1 and 300-2 based on the current values output from ammeters 111-1 and 111-2 and the full-charge capacities stored in full-charge capacity hold section 112.

A concrete calculation method will be described below.

With respect to a remaining capacity of cell 300-1, calculation section 113 multiplies the current value output from ammeter 111-1 and the time from a start of discharge (measured with a timer (not illustrated)) together and subtracts the product of multiplication from the full-charge capacity associated with cell 300-1 in full-charge capacity hold section 112 (10 Ah in the example shown in FIG. 3). The value thereby obtained is the remaining capacity of cell 300-1.

With respect to the remaining capacity of cell 300-2, calculation section 113 multiplies the current value output from ammeter 111-2 and the time from the start of discharge (measured with the timer) together and subtracts the product of multiplication from the full-charge capacity associated with cell 300-2 in full-charge capacity hold section 112 (9.6 Ah in the example shown in FIG. 3). The value thereby obtained is the remaining capacity of cell 300-2.

Calculation section 113 outputs the calculated remaining capacities of cells 300-1 and 300-2 to control section 130.

Storage section 120 stores a first threshold value and a second threshold value in advance.

The first threshold value is the value at the upper side (upper limit) of the above-described "degradation region".

The second threshold value is the value at the lower side (lower limit) of the above-described "degradation region".

FIG. 4 is a diagram showing an example of threshold values stored in storage section 120 shown in FIG. 1.

In storage section 120 shown in FIG. 1, the upper limit and the lower limit of the degradation region are stored as threshold values, as shown in FIG. 4.

For example, as shown in FIG. 4, 6 Ah is stored as a threshold value corresponding to the upper limit of the degradation region (first threshold value). Also, 4 Ah is stored as a threshold value corresponding to the lower limit of the degradation region (second threshold value). This indicates that the range of remaining capacity of the cell from 6 Ah to 4 Ah is the degradation region.

Control section 130 reads out the upper and lower limits of the degradation region stored in storage section 120, and compares the read upper and lower limits of the degradation region with the remaining capacities of cells 300-1 and 300-2 output from calculation section 113. If the remaining capacity of one of cells 300-1 and 300-2 is equal to the upper limit of the degradation region, control section 130 discharges only this cell until the remaining capacity of this cell becomes equal to the lower limit of the degradation region. At this time, priority may be giving discharging this cell. That is, in a case where three cells are connected in parallel with each other, the two-cell operation (discharge) of one of the cells whose remaining capacity is in the degradation region and one of the other two cells, two of these cells in all, may be performed.

For example, if the remaining capacity of cell 300-1 becomes equal to the upper limit of the degradation region, control section 130 maintains switch 400-1 in the closed state and maintains switch 400-2 in the open state until the remaining capacity of cell 300-1 becomes equal to the lower limit of the degradation region.

If the remaining capacity of cell 300-2 becomes equal to the upper limit of the degradation region, control section 130 maintains switch 400-2 in the closed state and maintains switch 400-1 in the open state until the remaining capacity of cell 300-2 becomes equal to the lower limit of the degradation region.

When the remaining capacity of cell 300-1 and the remaining capacity of cell 300-2 is out of the range from the upper limit to the lower limit of the degradation region, that is, when each remaining capacity is not in the degradation region, control section 130 may operate cells 300-1 and 300-2 in an ordinary two-cell parallel operation manner or may perform rotation discharge (discharge performed by control section 130 alternately repeating opening and closing of switches 400-1 and 400-2).

Thus, control section 130 controls discharge and nondischarge of cells 300-1 and 300-2 by opening and closing switches 400-1 and 400-2.

A method of discharge control in the exemplary embodiment shown in FIG. 1 will be described below.

Figure 5:
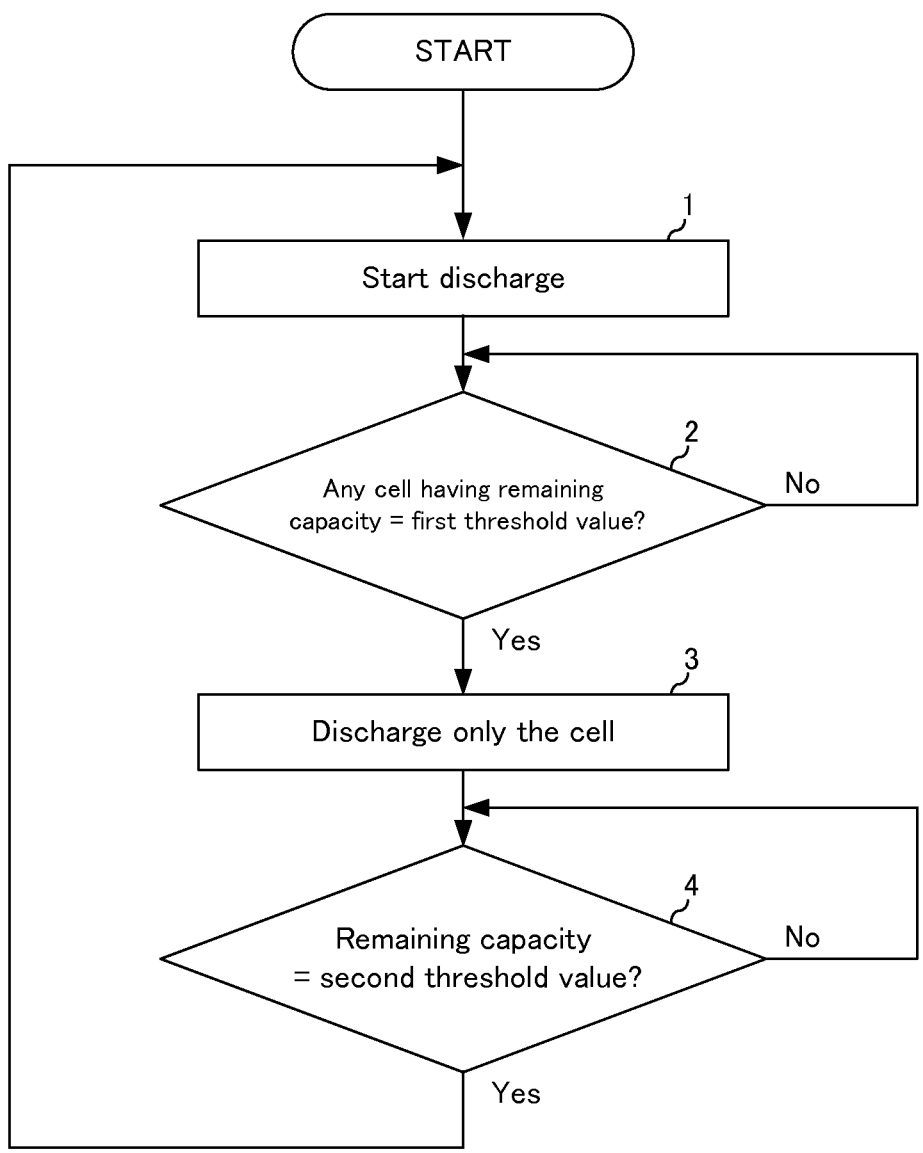
FIG. 5 is a flowchart for explaining a method of discharge control in the exemplary embodiment shown in FIG. 1.

FIG. 5 is a flowchart showing a method of discharge control in the exemplary embodiment shown in FIG. 1.

First, in step 1, the two-cell operation (discharge) of cells 300-1 and 300-2 is started. When discharge is started, the above-described timer starts operating.

When discharge is started, measurement of the currents flowing from cells 300-1 and 300-2 by ammeters 111-1 and 111-2 is started.

Thereafter, in step 2, control section 130 determines whether or not the remaining capacity of one of the cells is equal to the upper limit of the degradation region stored in storage section 120.

This determination is realized by calculation in calculation section 113 multiplying together the current values measured and output by ammeters 111-1 and 111-2 and the time measured with the timer and subtracting the products of multiplication from the full-charge capacities of cells 300-1 and 300-2 stored in full-charge capacity hold section 112, and by comparing the results of subtraction with the upper limit of the degradation region stored as the first threshold value in storage section 120.

Description will be made concretely by way of example with respect to a case where, for example, the full-charge capacities of cells 300-1 and 300-2 stored in full-charge capacity hold section 112 have the values shown in FIG. 3 (10 Ah and 9.6 Ah); the upper limit of the degradation region (first threshold value) stored in storage section 120 is the value shown in FIG. 4, i.e., 6 Ah; and the lower limit of the degradation region (second threshold value) is the value shown in FIG. 4, i.e., 4 Ah.

In a case where when the timer measures two hours, the current value measured and output by ammeter 111-1 is 1.6 A and the current value measured and output by ammeter 111-2 is 1.8 A, calculations described below are performed.

A calculation by (Equation 1) is made with respect to cell 300-1.

$$10 \text{ Ah (full-charge capacity)} - 1.6 \text{ A (current value)} \times 2 \text{ h (hours)} = 6.8 \text{ Ah (remaining capacity)} \quad \text{(Equation 1)}$$

A calculation by (Equation 2) is made with respect to cell 300-2.

$$9.6 \text{ Ah (full-charge capacity)} - 1.8 \text{ A (current value)} \times 2 \text{ h (hours)} = 6 \text{ Ah (remaining capacity)} \quad \text{(Equation 2)}$$

The remaining capacities calculated with respect to cells 300-1 and 300-2 are compared with the upper limit of the degradation region stored in storage section 120.

The remaining capacity of cell 300-1 is 6.8 Ah from (Equation 1) and the upper limit of the degradation region stored in storage section 120 is 6 Ah, so that the remaining capacity of cell 300-1 and the upper limit of the degradation region are not equal to each other.

On the other hand, the remaining capacity of cell 300-2 is 6 Ah from (Equation 2) and the upper limit of the degradation region stored in storage section 120 is 6 Ah, so that the remaining capacity of cell 300-2 and the upper limit of the degradation region are equal to each other.

As a result, the cell whose remaining capacity is equal to the upper limit of the degradation region is cell 300-2.

If control section 130 does not determine in step 2 that the remaining capacity of one of the cells is equal to the upper limit of the degradation region, discharge of cells 300-1 and 300-2 is further continued.

On the other hand, if control section 130 determines in step 2 that the remaining capacity of one of the cells is equal to the upper limit of the degradation region, discharge of only the cell whose remaining capacity is equal to the upper limit of the degradation region is performed in step 3. Control section 130 performs this discharge control by using closing/opening of switches 400-1 and 400-2, as described above.

In the above-described example (the case where cell 300-2 is the cell whose remaining capacity became equal to the upper limit of the degradation region), control section 130 sets switch 400-1 in the open state. Cell 300-1 that is connected to switch 400-1 is not discharged thereafter. On the other hand, control section 130 sets switch 400-2 in the closed (connected) state. Discharge of cell 300-2 that is connected to switch 400-2 is performed thereby.

Thereafter, control section 130 determines in step 4 whether or not the remaining capacity of the cell presently discharged is equal to the lower limit of the degradation region stored in storage section 120.

In the above-described example (discharge of only cell 300-2 is performed), the remaining capacity of cell 300-2 is calculated by remaining capacity calculation section 110, and the calculated remaining capacity and the lower limit of the degradation region stored in storage section 120 (4 Ah in the example shown in FIG. 4) are compared. This remaining capacity calculation method uses the equation shown above.

If control section 130 does not determine in step 4 that the remaining capacity of the cell presently discharged is equal to the lower limit of the degradation region, that is, control section 130 determines that the remaining capacity of the cell presently discharged is not equal to the lower limit of the degradation region, discharge of this cell is further continued. In the above-described example, since discharge of only cell 300-2 is performed, discharge of only cell 300-2 is continued if control section 130 determines that the remaining capacity of cell 300-2 is not equal to the lower limit of the degradation region.

On the other hand, if control section 130 determines in step 4 that the remaining capacity of the cell presently discharged is equal to the lower limit of the degradation region, processing in step 1 is performed. In the above-described example, since discharge of only cell 300-2 is performed, the two-cell operation (discharge) of cells 300-1 and 300-2 is performed (restarted) if control section 130 determines that the remaining capacity of cell 300-2 is equal to the lower limit of the degradation region.

Thereafter, the remaining capacity of cell 300-1 also becomes equal to the upper limit of the degradation region stored in storage section 120. In that case, the same processing is also performed for discharge of only cell 300-1.

A case where (full-charge capacity)−(current value)×(discharge time), as described by using (Equation 1) and (Equation 2), is used as the remaining capacity of each cell has been described. However, the value of voltage across each cell may alternatively be used.

Figure 6:
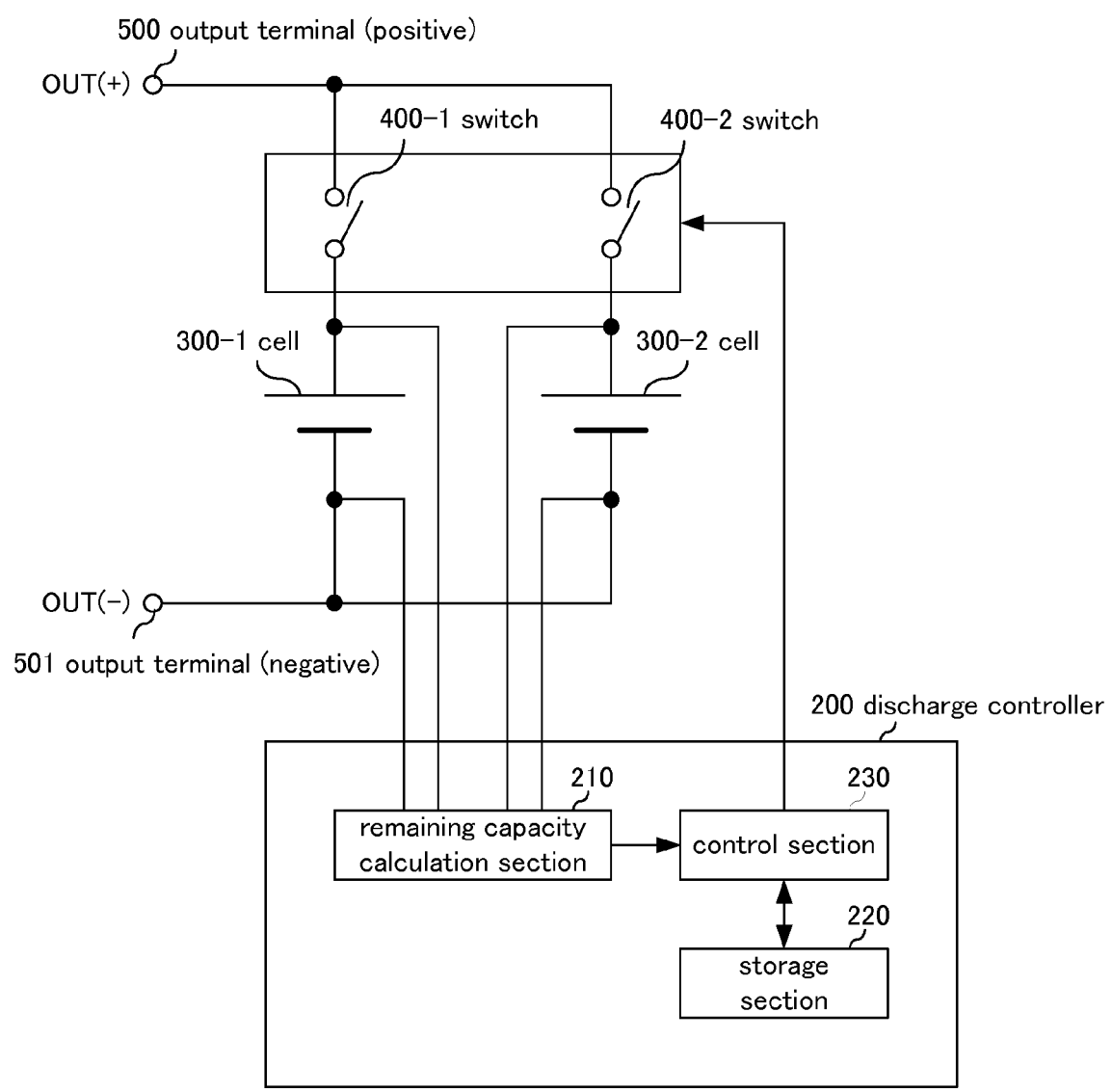
FIG. 6 is a diagram showing another exemplary embodiment of the discharge controller of the present invention.

FIG. 6 is a diagram showing another exemplary embodiment of the discharge controller of the present invention.

As shown in FIG. 6, the present exemplary embodiment includes discharge controller 200, cells 300-1 and 300-2, switches 400-1 and 400-2, output terminal (positive) 500 and output terminal (negative) 501.

Cells 300-1 and 300-2, switches 400-1 and 400-2, output terminal (positive) 500 and output terminal (negative) 501 are the same as those used in the exemplary embodiment shown in FIG. 1. In the present exemplary embodiment, the positive electrode side of cell 300-1 and switch 400-1 are directly connected to each other. Also, the positive electrode side of cell 300-2 and switch 400-2 are directly connected to each other.

Discharge controller 200 controls discharge of cells 300-1 and 300-2 by controlling closing/opening of switches 400-1 and 400-2 based on remaining capacities of cells 300-1 and 300-2.

In discharge controller 200, remaining capacity calculation section 210, storage section 220 and control section 230 are provided, as shown in FIG. 6.

Remaining capacity calculation section 210 calculates remaining capacities of cells 300-1 and 300-2. Remaining capacity calculation section 210 calculates as remaining capacities the values of voltages across cells 300-1 and 300-2. Strictly speaking, in the case of using the voltage value as a remaining capacity as described above, the present resistance value is calculated from the present current and voltage values, and a voltage value estimated based on them by an open voltage method is calculated as the remaining capacity.

Figure 7:
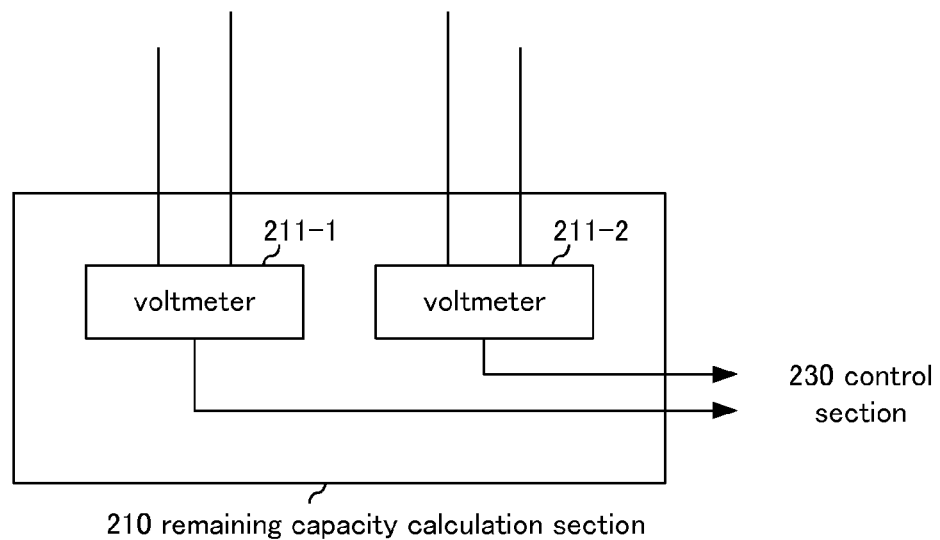
FIG. 7 is a diagram showing an example of an internal configuration of a remaining capacity calculation section shown in FIG. 6.

FIG. 7 is a diagram showing an example of an internal configuration of remaining capacity calculation section 210 shown in FIG. 6.

In remaining capacity calculation section 210 shown in FIG. 6, voltmeters 211-1 and 211-2 are provided, as shown in FIG. 7.

Voltmeter 211-1 measures the voltage across cell 300-1. Voltmeter 211-1 outputs the measured value of voltage across cell 300-1 to control section 230.

Voltmeter 211-2 measures the voltage across cell 300-2. Voltmeter 211-2 outputs the measured value of voltage across cell 300-2 to control section 230.

A method of calculating, when cells 300-1 and 300-2 shown in FIG. 6 are discharged, remaining cell capacities, with respect to time, based upon changes in the values of voltages across cells 300-1 and 300-2 respectively measured by voltmeters 211-1 and 211-2 will be described below. A method of calculating a remaining capacity, with respect to time, based upon a change with respect to time in the value of voltage across cell 300-1 measured by voltmeter 211-1 when cell 300-1 is discharged will be described hereinbelow by way of example. A method of calculating a remaining capacity, with respect to time, based upon a change with respect to time in the value of voltage across cell 300-2 measured by voltmeter 211-2 when cell 300-2 is discharged is the same as the method of calculation with respect to cell 300-1.

Figure 8:
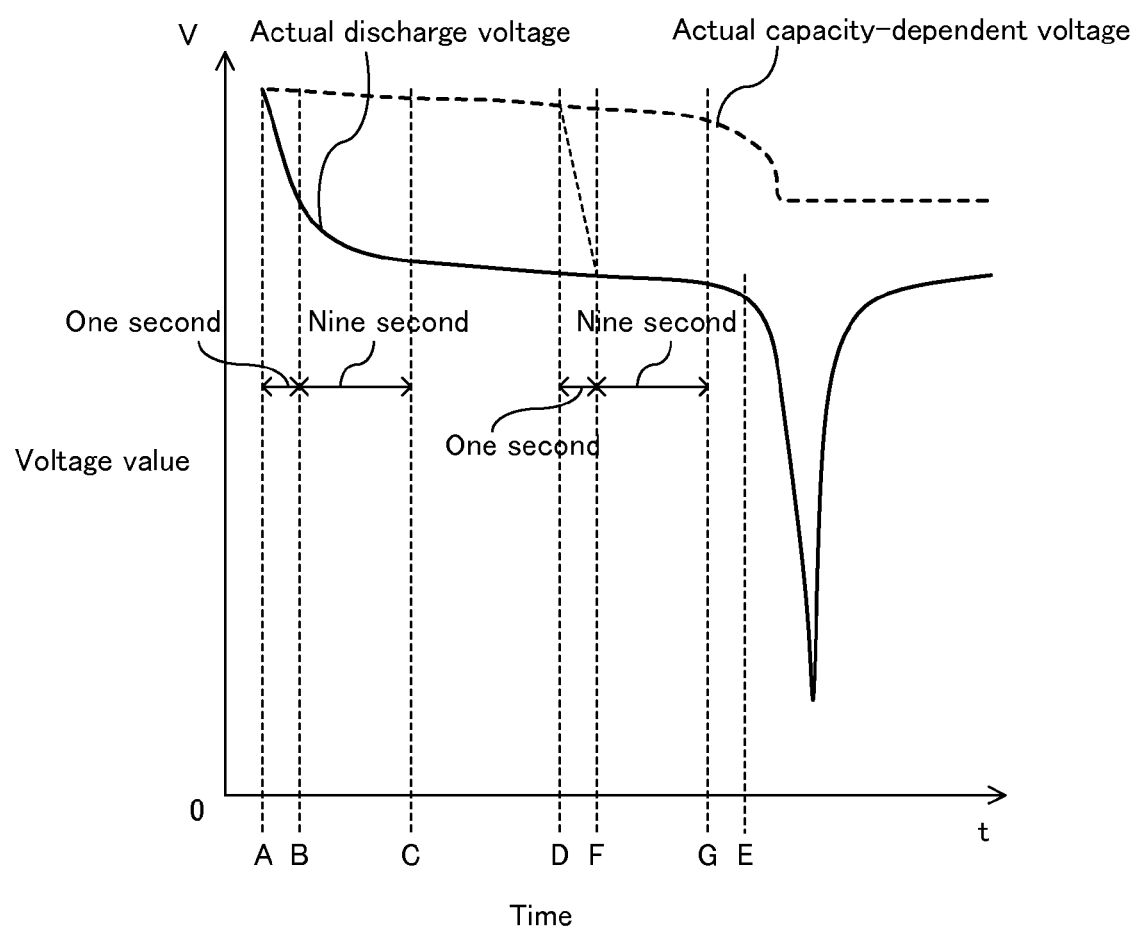
FIG. 8 is a diagram showing an example of changes with respect to time in the value of voltage across a cell shown in FIG. 6 measured by a voltmeter when the cell is discharged.

FIG. 8 is a diagram showing an example of changes with respect to time in the value of voltage across cell 300-1 measured by voltmeter 211-1 when cell 300-1 shown in FIG. 6 is discharged.

As shown in FIG. 8, the value of voltage across cell 300-1 measured by voltmeter 211-1 ("actual discharge voltage" indicated by the solid line in FIG. 8) is lower than the actual capacity-dependent voltage indicated by the broken line because an external impedance, which is an external cause that is separate from the internal impedance of cell 300-1, is added as a causal resistance value (impedance) to the internal impedance of cell 300-1.

Therefore, the voltage value is estimated (corrected) by using the above-mentioned open voltage method.

"A" shown in FIG. 8 denotes a time at which discharge starts (point A), and "E" shown in FIG. 8 denotes a time at which discharge ends (point E). Point B is a point one second after point A, and point C is a point nine seconds after point B.

A one-second average impedance between point A and point B is first calculated. Since the time period from point A to point B is one second, the impedance calculated at one point (point A) is the one-second average impedance between point A and point B. The calculated impedance is expressed as a $\Omega$. This impedance a $\Omega$ is the sum of the internal impedance of the above-described cell 300-1 and the other external impedance.

A one-second average impedance between point B and point C is thereafter calculated. Since the time period from point B to point C is nine seconds, impedance calculation is performed nine times at intervals of one second to obtain a one-second average value. The calculated impedance is expressed as b $\Omega$. This b $\Omega$ is the internal impedance of the above-described cell 300-1.

Therefore, c $\Omega$, which is the external impedance, can be calculated by subtracting b $\Omega$ from a $\Omega$(a−b=c).

Thereafter, as discharge end point E is being reached, a one-second average impedance for one second (between point D and point F) and a one-second average impedance for nine seconds (between point F and point G) are also calculated.

At point E, impedance is calculated from the value of voltage across cell 300-1 measured by voltmeter 211-1. The voltage at point F can be obtained by adding the voltage drop that corresponds to b Ω from the calculated impedance at point E.

Subsequently, the actual capacity-dependent voltage (remaining capacity) can be calculated by adding the external impedance c Ω to the average of the one-second average impedance between point D and point F (1DΩ) and the one-second average impedance between point F and point G (9D Ω), and by multiplying the value obtained by this addition by the current value (I). That is, if the remaining capacity is CAPV, $$CAPV=((1D+9D)/2+c)\times I$$

If the value of the external impedance c Ω is set in advance, it may be used. Remaining capacity calculation section 210 may calculate remaining capacities of cells 300-1 and 300-2 in this way.

Storage section 220 stores a first threshold value and a second threshold value in advance.

The first threshold value is the value at the upper side (upper limit) of the above-described "degradation region". The second threshold value is the value at the lower side (lower limit) of "the degradation region".

FIG. 9 is a diagram showing an example of the threshold values stored in storage section 220 shown in FIG. 6.

As shown in FIG. 9, the upper limit and the lower limit are stored as threshold values in storage section 220 shown in FIG. 6.

For example, as shown in FIG. 9, 2.4 V is stored as a threshold value corresponding to the upper limit of the degradation region (first threshold value). Also, 1.6 V is stored as a threshold value corresponding to the lower limit of the degradation region (second threshold value). This indicates that the range of voltage value of the cell from 2.4 V to 1.6 V that corresponds to remaining capacities of the cell is the degradation region.

Control section 230 reads out the upper and lower limits of the degradation region stored in storage section 220, and compares the read upper and lower limits of the degradation region with the voltage values output from voltmeters 211-1 and 211-2 as remaining capacities of cells 300-1 and 300-2. If the voltage value of one of cells 300-1 and 300-2 is equal to the upper limit of the degradation region, control section 230 discharges only this cell until the voltage value of this cell becomes equal to the lower limit of the degradation region.

For example, if the voltage value of cell 300-1 becomes equal to the upper limit of the degradation region, control section 230 maintains switch 400-1 in the closed state and maintains switch 400-2 in the open state until the voltage value of cell 300-1 becomes equal to the lower limit of the degradation region.

If the voltage value of cell 300-2 becomes equal to the upper limit of the degradation region, control section 230 maintains switch 400-2 in the closed state and maintains switch 400-1 in the open state until the voltage value of cell 300-2 becomes equal to the lower limit of the degradation region.

When the voltage value of cell 300-1 and the voltage value of cell 300-2 are out of the range from the upper limit to the lower limit of the degradation region, that is, each voltage value is not in the degradation region, control section 230 may operate cells 300-1 and 300-2 in an ordinary two-cell parallel operation manner or may perform rotation discharge of cells 300-1 and 300-2.

Specifically, in such a case, control section 230 may repeat alternately opening and closing switches 400-1 and 400-2.

Thus, control section 230 controls discharge and non-discharge of cells 300-1 and 300-2 by opening and closing switches 400-1 and 400-2.

A method of discharge control in the exemplary embodiment shown in FIG. 6 will be described below.

Figure 10:
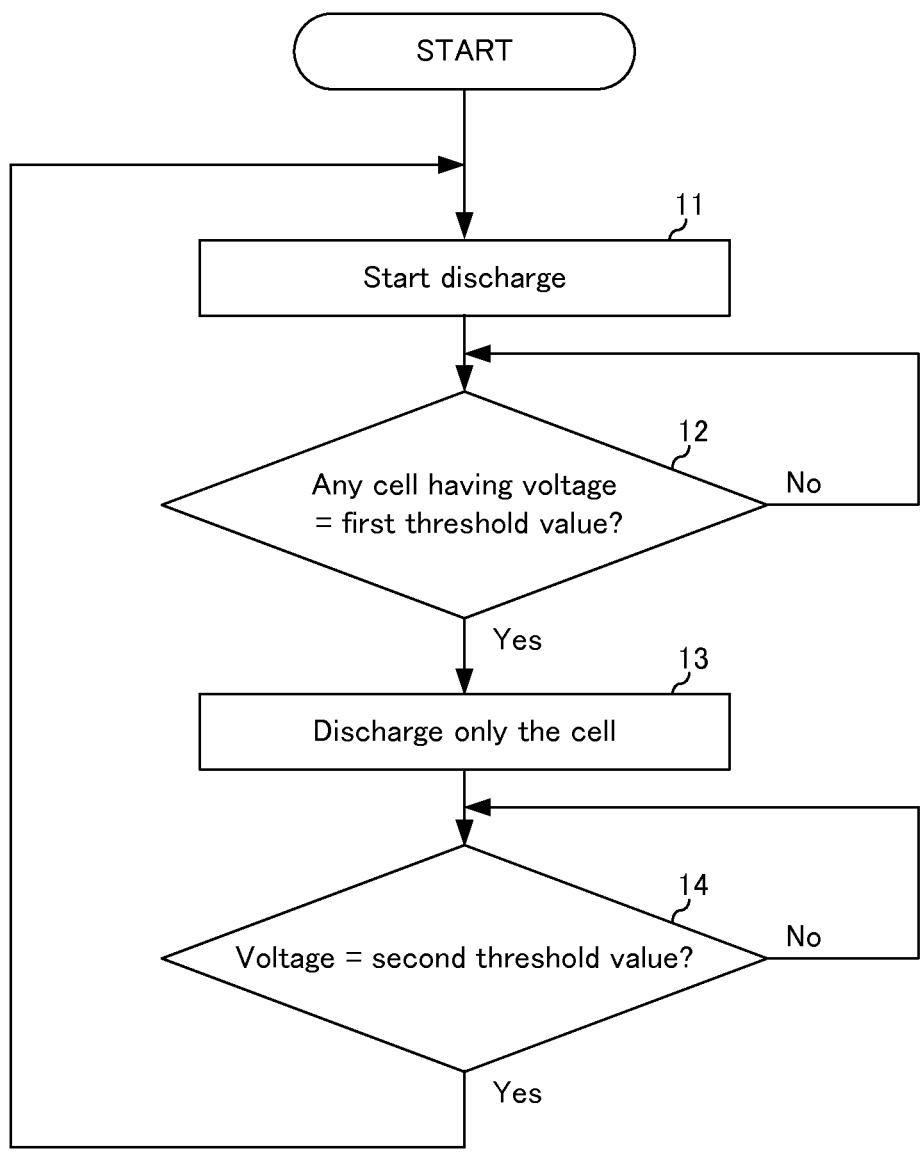
FIG. 10 is a flowchart for explaining a method of discharge control in the exemplary embodiment shown in FIG. 6.

FIG. 10 is a flowchart showing a method of discharge control in the exemplary embodiment shown in FIG. 6.

First, in step 11, the two-cell operation (discharge) of cells 300-1 and 300-2 is started.

When discharge is started, measurement of the values of voltages across cells 300-1 and 300-2 by voltmeters 211-1 and 211-2 is started.

Thereafter, in step 12, control section 230 determines whether or not the voltage value of one of the cells measured by voltmeter 211-1 or 211-2 is equal to the upper limit of the degradation region stored in storage section 220.

This determination is made based on the result comparing the voltage value measured by voltmeter 211-1 or 211-2 with the value equal to the upper limit of the degradation region stored in storage section 220.

For example, in a case where threshold values that corresponds to the upper limit (2.4 V) and the lower limit (1.6 V) of the degradation region as shown in FIG. 9 are stored in storage section 220, if the voltage value measured by voltmeter 211-1 is 2.4 V, and if the voltage value measured by voltmeter 211-2 is 2.5 V, control section 230 determines that the voltage value of cell 300-1 measured by voltmeter 211-1 is equal to the upper limit of the degradation region.

If control section 230 does not determine in step 12 that the voltage value of one of the cells is equal to the upper limit of the degradation region, discharge of cells 300-1 and 300-2 is further continued.

On the other hand, if control section 230 determines in step 12 that the voltage value of one of the cells is equal to the upper limit of the degradation region, discharge of only the cell whose voltage value is equal to the upper limit of the degradation region is performed in step 13. Control section 230 performs this discharge control by using closing/opening of switches 400-1 and 400-2, as described above.

In the above-described example (the case where cell 300-1 is the cell whose voltage value became equal to the upper limit of the degradation region), control section 230 sets switch 400-2 in the open state. Cell 300-2 that is connected to switch 400-2 is not discharged thereafter. On the other hand, control section 230 sets switch 400-1 in the closed (connected) state. Discharge of cell 300-1 that is connected to switch 400-1 is performed thereby.

Thereafter, control section 230 determines in step 14 whether or not the voltage value of the cell presently discharged is equal to the lower limit of the degradation region stored in the storage section 220.

In the above-described example (discharge of only cell 300-1 is performed), the voltage value of cell 300-1 measured by voltmeter 211-1 and the lower limit of the degradation region stored in storage section 220 (1.6 V in the example shown in FIG. 9) are compared.

If control section 230 does not determine in step 14 that the voltage value of the cell presently discharged is equal to the lower limit of the degradation region, that is, control section 230 determines that the voltage value of the cell presently discharged is not equal to the lower limit of the degradation region, discharge of this cell is further continued. Since discharge of only cell 300-1 is performed in the above-described example, discharge of only cell 300-1 is continued if control section 230 determines that the voltage value of cell 300-1 that is measured by voltmeter 211-1 is not equal to the lower limit of the degradation region.

If control section 230 determines in step 14 that the voltage value of the cell presently discharged is equal to the lower limit of the degradation region, processing in step 11 is performed. Since discharge of only cell 300-1 is performed in the above-described example, the two-cell operation (discharge) of cells 300-1 and 300-2 is performed (restarted) if control section 230 determines that the voltage value of cell 300-1 that is measured by voltmeter 211-1 is equal to the lower limit of the degradation region.

Thereafter, the voltage value of cell 300-2 measured by voltmeter 211-2 also becomes equal to the upper limit of the degradation region stored in storage section 220. In that case, the same processing is also performed for discharge of only cell 300-2.

As described above, only the cell whose remaining capacity has entered the degradation region during discharge of the plurality of cells that are connected in parallel with each other is discharged, thus enabling fast passage through the degradation region. This effect will be described below with reference to the drawings. A case where two cells are connected in parallel with each other will be described below by way of example.

Figure 11:
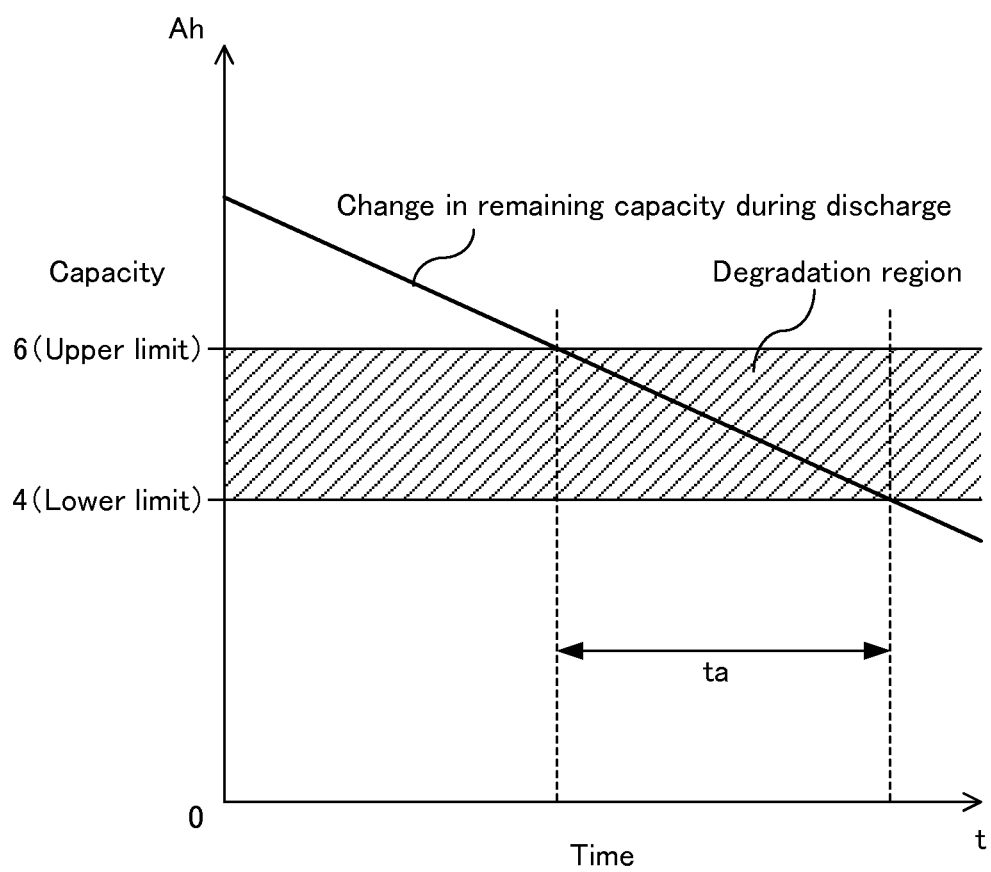
FIG. 11 is a graph showing change in remaining capacity of an ordinary cell with respect to time as the cell is discharged.

FIG. 11 is a graph showing change in remaining capacity of an ordinary cell with respect to time as the cell is discharged.

Figure 12:
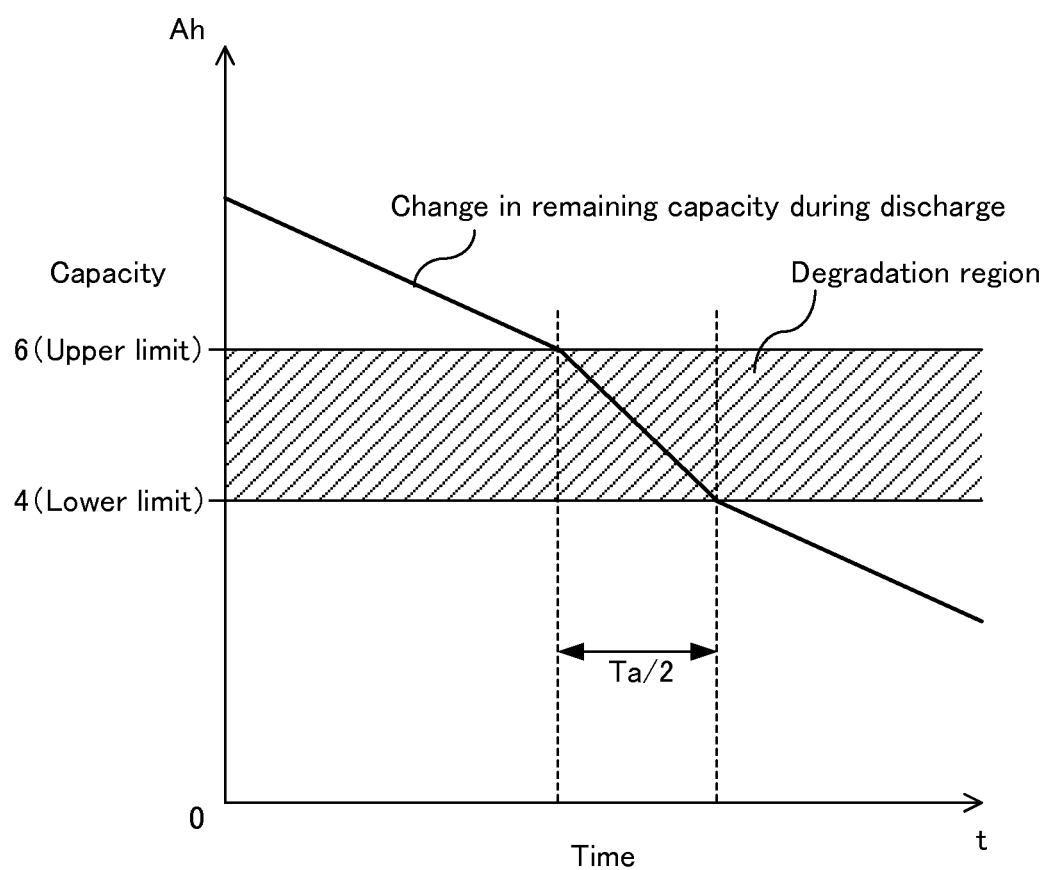
FIG. 12 is a graph showing an example of change in remaining capacity of a cell with respect to time as the cell is discharged according to the present invention.

FIG. 12 is a graph showing an example of change in remaining capacity of a cell with respect to time as the cell is discharged according to the present invention.

In ordinary cases, as shown in FIG. 11, the remaining capacity of a cell decreases at a generally constant rate with respect to discharge time. The time period taken for passage through the degradation region from a capacity of 6 Ah to a capacity of 4 Ah is assumed to be Ta.

On the other hand, as shown in FIG. 12, since discharge of only one cell is performed from the remaining capacity 6 A that corresponds to the upper limit of the degradation region to 4 Ah, the rate of reduction in remaining capacity of the cell with respect to time in the degradation region is increased. That is, the time taken for passage through the degradation region in discharge of the cell is reduced. As shown in FIG. 12, in the case described here by way of example, where two cells are connected in parallel with each other, the time taken for passage through the degradation region is reduced to Ta/2, i.e., to half of the time in the case shown in FIG. 11.

Needless to say, the degradation region passage time is reduced to ⅓ in a case where three cells are connected in parallel with each other, and the degradation region passage time is reduced to ¼ in a case where four cells are connected in parallel with each other.

The above-described method of calculating the remaining capacity of the cell is not exclusively used.

Thus, when a cell has a remaining capacity in a degradation region by discharge, the time taken for passage through the degradation region can be reduced by discharging only this cell. As a result, an extension of the life of the cell can be achieved. This effect is particularly high when discharge control is performed on lithium-ion cells that have manganese-based positive poles in which a degradation region is noticeably recognized.

While a process in which when a cell has a remaining capacity in a degradation region by discharge, only this cell is discharged has been described, a process may alternatively be performed in which discharge of one of cells having a remaining capacity immediately before its reaching the degradation region is stopped while discharge of the other cells is performed.

Figure 13:
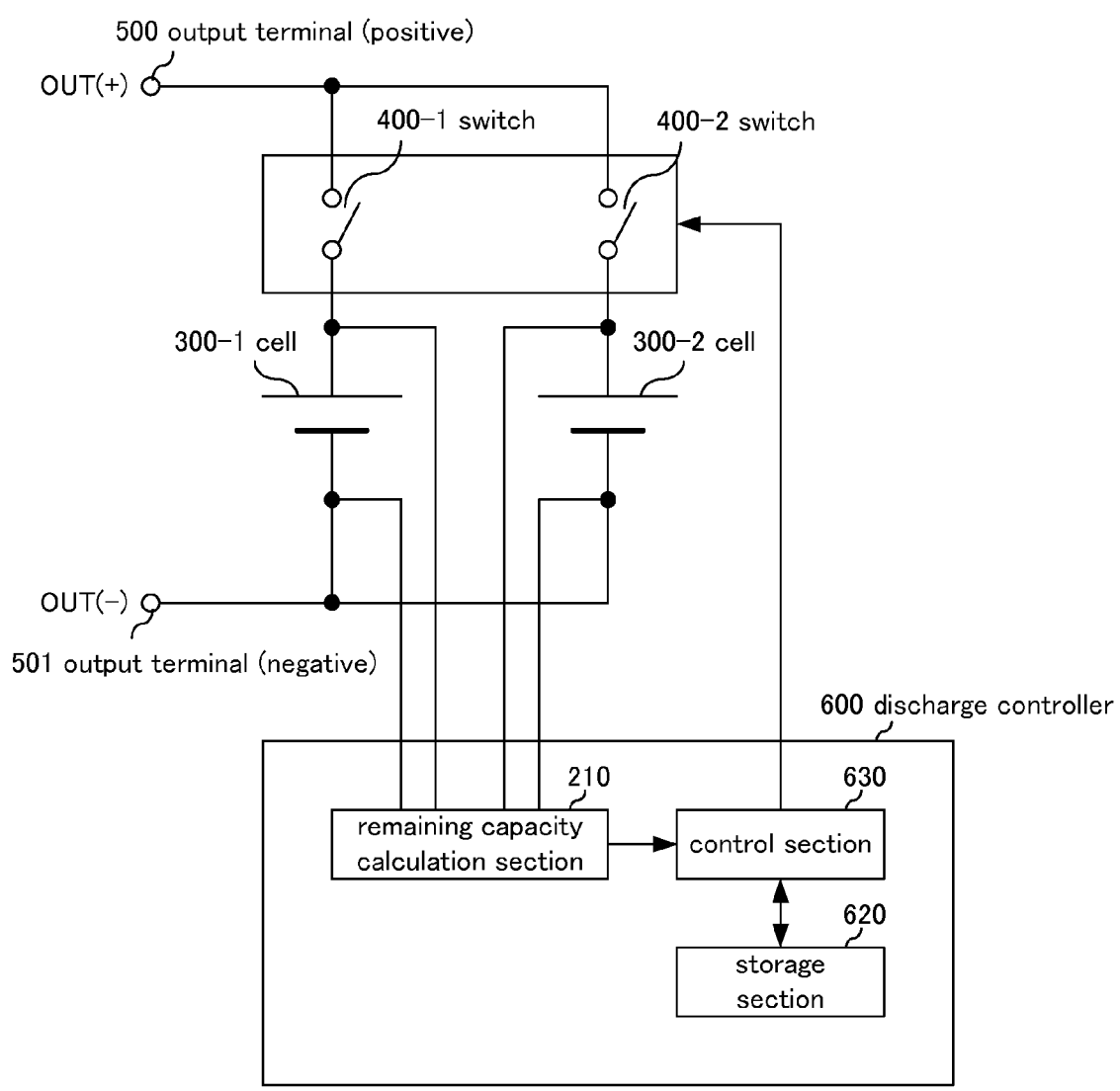
FIG. 13 is a diagram showing still another exemplary embodiment of the discharge controller of the present invention.

FIG. 13 is a diagram showing another exemplary embodiment of the discharge controller of the present invention.

As shown in FIG. 13, the present exemplary embodiment includes discharge controller 600, cells 300-1 and 300-2, switches 400-1 and 400-2, output terminal (positive) 500 and output terminal (negative) 501.

Cells 300-1 and 300-2, switches 400-1 and 400-2, output terminal (positive) 500 and output terminal (negative) 501 are the same as those used in the exemplary embodiment shown in FIG. 6. In the present exemplary embodiment, the positive electrode side of cell 300-1 and switch 400-1 are directly connected to each other as in the exemplary embodiment shown in FIG. 6. Also, the positive electrode side of cell 300-2 and switch 400-2 are directly connected to each other.

Discharge controller 600 controls discharge of cells 300-1 and 300-2 by controlling closing/opening of switches 400-1 and 400-2 based on remaining capacities of cells 300-1 and 300-2.

In discharge controller 600, remaining capacity calculation section 210, storage section 620 and control section 630 are provided, as shown in FIG. 13.

Remaining capacity calculation section 210 is the same as that shown in FIG. 6 (the internal configuration is the same as that shown in FIG. 7).

Storage section 620 stores a threshold value in advance.

The threshold value stored in storage section 620 is a value larger by a predetermined value than the value at the upper side (upper limit) of the above-described "degradation region". That is, this threshold value is stored as a value on the verge of the "degradation region".

Figure 14:
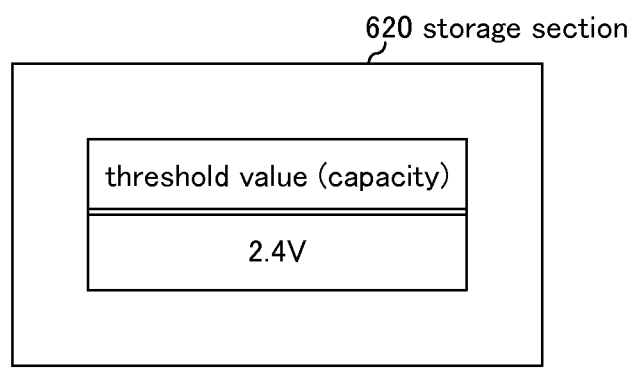
FIG. 14 is a diagram showing an example of threshold values stored in a storage section shown in FIG. 13.

FIG. 14 is a diagram showing an example of the threshold value stored in storage section 620 shown in FIG. 13.

As shown in FIG. 14, a threshold value is stored in storage section 620 shown in FIG. 13.

For example, 2.4 V is stored as the threshold value (capacity), as shown in FIG. 14. This indicates that when the voltage value of the cell, or a remaining capacity of the cell, reaches 2.4 V, it also reaches a value on the border of the degradation region.

Control section 630 reads out the threshold value stored in storage section 620 after starting discharge of cells 300-1 and 300-2, and compares the read threshold value and the voltage values output from voltmeters 211-1 and 211-2 as remaining capacities of cells 300-1 and 300-2. Control section 630 stops discharge of the first cell from cells 300-1 and 300-2 whose voltage value becomes equal to the threshold value. At this time, control section 630 continues discharge of the other cell—cell 300-1 or cell 300-2—whose voltage value has not become equal to the threshold value.

For example, when the voltage value of cell 300-1 becomes equal to the threshold value after control section 630 has started discharge by closing switches 400-1 and 400-2, control section 630 sets switch 400-1 in the open state while maintaining switch 400-2 in the closed state.

When the voltage value of cell 300-2 thereafter becomes equal to the threshold value, control section 630 sets switch 400-2 in the open state while maintaining switch 400-1 in the open state.

Control section 630 may operate cells 300-1 and 300-2 in an ordinary two-cell parallel operation manner or may perform rotation discharge of cells 300-1 and 300-2 when the voltage value of cell 300-1 and the voltage value of cell 300-2 are each not equal to the threshold value. Specifically, in such a case, control section 630 may alternately perform opening and closing of switches 400-1 and 400-2.

Thus, control section 630 controls discharge and non-discharge of cells 300-1 and 300-2 by opening and closing switches 400-1 and 400-2.

A method of discharge control in the exemplary embodiment shown in FIG. 13 will be described below.

Figure 15:
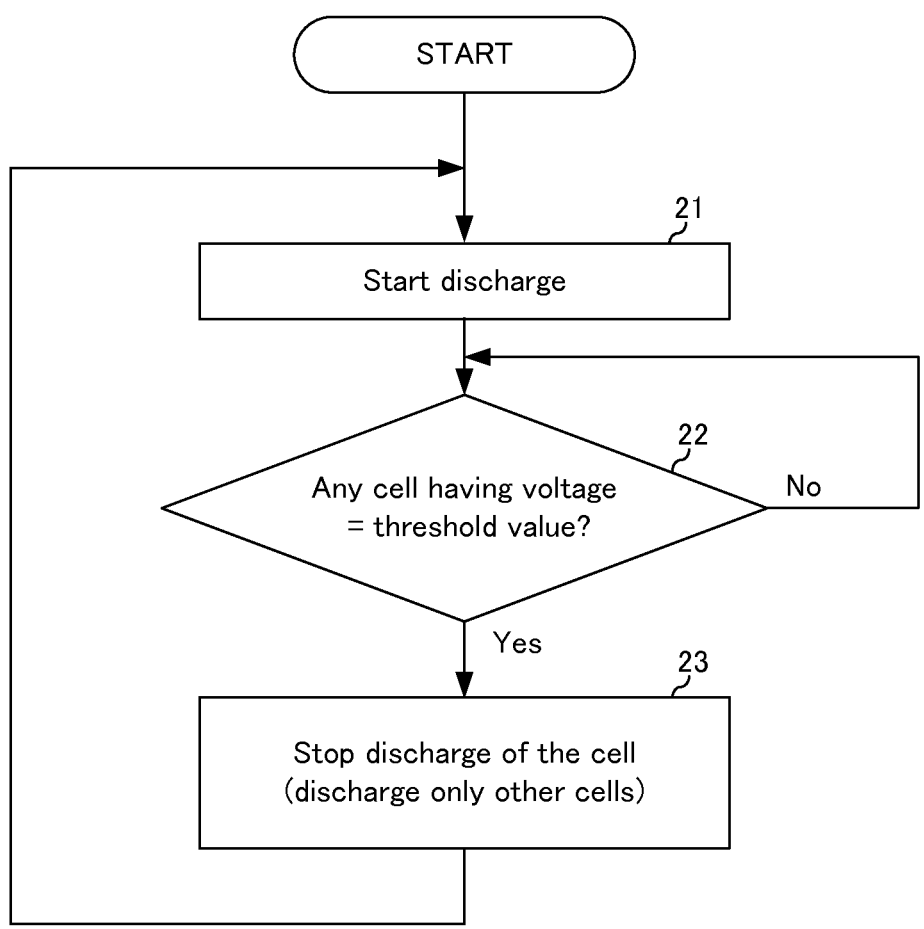
FIG. 15 is a flowchart for explaining a method of discharge control in the exemplary embodiment shown in FIG. 13.

FIG. 15 is a flowchart showing a method of discharge control in the exemplary embodiment shown in FIG. 13.

First, in step 21, the two-cell operation (discharge) of cells 300-1 and 300-2 is started.

When discharge is started, measurement of the values of voltages across cells 300-1 and 300-2 by voltmeters 211-1 and 211-2 is started.

Thereafter, in step 22, control section 630 determines whether or not the voltage value of one of the cells measured by voltmeter 211-1 or 211-2 is equal to the threshold value stored in storage section 620.

This determination is made based on the result of comparing the voltage value measured by voltmeter 211-1 or 211-2 with the threshold value stored in storage section 620. This voltage value may be a value calculated by using the above-described open voltage method.

For example, in a case where a threshold value (2.4 V) such as shown in FIG. 14 is stored in storage section 620, if the voltage value measured by voltmeter 211-1 is 2.4 V while the voltage value measured by voltmeter 211-2 is 2.5 V, control section 630 determines that the voltage value of cell 300-1 measured by voltmeter 211-1 is equal to the threshold value.

If control section 630 does not determine in step 22 that the voltage value of one of the cells is equal to the threshold value, that is, the remaining capacities of cells 300-1 and 300-2 are each larger than the threshold value, discharge of cells 300-1 and 300-2 is continued.

On the other hand, if control section 630 determines in step 22 that the voltage value of one of the cells is equal to the threshold value, it stops discharge of the cell whose voltage value is equal to the threshold value, and only discharge of the other cell is performed in step 23. Control section 630 performs this discharge control by using closing/opening of switches 400-1 and 400-2, as described above.

In the above-described example (the case where cell 300-1 is the cell whose voltage value became equal to the threshold value), control section 630 sets switch 400-1 in the open state. Cell 300-1 that is connected to switch 400-1 is not discharged thereafter. On the other hand, control section 630 maintains switch 400-2 in the closed (connected) state. Discharge of cell 300-2 that is connected to switch 400-2 is continued thereby.

Thereafter, the voltage value of cell 300-2 measured by voltmeter 211-2 also becomes equal to the threshold value stored in storage section 620. In that case, discharge of cell 300-2 is also stopped.

As described above, in the course of discharging a plurality of cells connected in parallel with each other, discharge of one of the cells whose remaining capacity becomes equal to a value on the border of the degradation region is stopped, thus enabling avoiding passage of the cell through the degradation region.

The method of calculating the remaining capacity of the cell is not limited to that described above. For example, a method using (full-charge capacity)−(current value)×(discharge time), as described above with reference to FIGS. 1 to 5, may alternatively be used.

Thus, when the remaining capacity of a cell approaches the degradation region, discharge of the cell is stopped. Passage through the degradation region can be avoided by stopping discharge of the cell. As a result, extension of the cell life can be achieved. This effect is particularly high when discharge control is performed on lithium-ion cells that have manganese-based positive poles in which a degradation region is noticeably recognized.

Easily understandable numeric values including capacities have been used in the above text or the drawings for ease of description. Not all of them are the same as the actual values.

Processing operations performed by the components provided in the above-described discharge controller 100 or 200 may be performed by logic circuits made according to the purpose. Also, a program in which details of the processing operations are described may be recorded on a recording medium readable in discharge controller 100 or 200, and the program recorded on this recording medium may be read by discharge controller 100 or 200 to be executed. "Recording medium readable in discharge controller 100 or 200" denotes a removable recording medium such as a floppy (trademark) disk, a magneto-optical disk, a DVD or a CD, or a memory such as a ROM or a RAM, an HDD or the like incorporated in discharge controller 100 or 200. The program recorded on this recording medium is read by a CPU (not shown in the drawings) provided in discharge controller 100 or 200 and processing operations similar to those described above are performed under the control of the CPU. The CPU operates as a computer to execute the program read from the recording medium on which the program is recorded.

The invention of the present application has been described by referring to the exemplary embodiments. However, the invention of the present application is not limited to the above-described exemplary embodiments. Various changes and modifications understandable by those skilled in the art can be made to the configuration and details of the invention of the present application within the scope of the invention of the present application.

This application is based upon and claims the benefit of priority from the prior Japanese Application No. 2010-287948 filed on Dec. 24, 2010; the entire contents of which are incorporated herein by reference.

The invention claimed is:

1. A discharge controller for controlling discharge of a plurality of cells connected in parallel with each other, wherein the cells of the plurality of cells comprise a degradation region defined within an intermediate region of a discharge capacity of the cells, the controller comprising:

a remaining capacity calculation section that calculates remaining capacities for each of the plurality of cells; and a control section that, when the remaining capacity of a first cell of the plurality of cells calculated by said remaining capacity calculation section becomes equal to a first threshold value, prioritizes discharge of the first cell until the remaining capacity of the first cell becomes equal to a second threshold value, wherein the first threshold value is an upper limit of the degradation region representing a first discharge capacity, wherein the second threshold value is a lower limit of the degradation region representing a second discharge capacity.

2. The discharge controller according to claim 1, wherein when the remaining capacity of the first cell calculated by said remaining capacity calculation section becomes equal to the first threshold value, said control section discharges only the first cell until the remaining capacity of the first cell becomes equal to the second threshold value.

3. The discharge controller according to claim 1, wherein said remaining capacity calculation section measures currents flowing from the cells and the time from the start of discharge of the cells, and obtains, as the remaining capacities, values calculated by respectively subtracting the products of multiplication of the measured currents and time from the full-charge capacities of the cells.

4. The discharge controller according to claim 1, wherein said remaining capacity calculation section measures voltages across the cells and obtains the measured voltages as the remaining capacities.

5. The discharge controller according to claim 1, further comprising a storage section that stores the first threshold value and the second threshold value in advance,
wherein said control section reads out the first threshold value and the second threshold value stored in said storage section and compares the first and second threshold values with the remaining capacities.

6. The discharge controller according to claim 1, wherein said control section controls discharge and non-discharge of the plurality of cells by opening and closing a plurality of switches for establishing or breaking connections between the plurality of cells and an output terminal through which cells are externally discharged.

7. The discharge controller according to claim 1, wherein said control section performs rotation discharge of the plurality of cells when each of the remaining capacities of the plurality of cells is outside the range between the first threshold value and the second threshold value.

8. A discharge control method of controlling discharge of a plurality of cells connected in parallel with each other, wherein the cells of the plurality of cells comprise a degradation region defined within an intermediate region of a discharge capacity of the cells, the method comprising the steps of:
calculating remaining capacities for each of the plurality of cells; and
prioritizing discharge of a first cell of the plurality of cells, when the calculated remaining capacity of the first cell becomes equal to a first threshold value, until the remaining capacity of the first cell becomes equal to a second threshold value, wherein the first threshold value is an upper limit of the degradation region representing a first discharge capacity, wherein the second threshold value is a lower limit of the degradation region representing a second discharge capacity.

9. The discharge control method according to claim 8, comprising the step of discharging, when the calculated remaining capacity of the first cell becomes equal to a first threshold value, only the first cell until the remaining capacity of the first cell becomes equal to the second threshold value.

10. The discharge control method according to claim 8, wherein said calculation step includes measuring currents flowing from the cells and the time from the start of discharge of the cells, and obtaining, as the remaining capacities, values calculated by respectively subtracting the products of multiplication of the measured currents and time from the full-charge capacities of the cells.

11. The discharge control method according to claim 8, wherein said calculation step includes measuring voltages across the cells and obtaining the measured voltages as the remaining capacities.

12. The discharge control method according to claim 8, further comprising the step of performing rotation discharge of the plurality of cells when each of the remaining capacities of the plurality of cells is outside the range between the first threshold value and the second threshold value.

* * * * *